J. J. BYERS.

RAIL ANCHOR.

APPLICATION FILED DEC. 20, 1911.

Reissued Apr. 23, 1912.

13,407.

WITNESSES

R. A. Balderson

Jesse B. Heller

INVENTOR

J. J. Byers by Bakewell Byers & Bonnell his attys

UNITED STATES PATENT OFFICE.

JACOB J. BYERS, OF CHICAGO, ILLINOIS, ASSIGNOR TO THE NATIONAL MALLEABLE CASTINGS COMPANY, OF CLEVELAND, OHIO, A CORPORATION OF OHIO.

RAIL-ANCHOR.

13,407. Specification of Reissued Letters Patent. Reissued Apr. 23, 1912.

Original No. 978,110, dated December 6, 1910, Serial No. 557,530. Application for reissue filed December 20, 1911. Serial No. 667,032.

*To all whom it may concern:*

Be it known that I, JACOB J. BYERS, resident of Chicago, Cook county, Illinois, have invented a new and useful Improvement in Rail-Anchors, of which the following is a full, clear, and exact description, reference being had to the accompanying drawings, forming part of this specification, in which—

Figure 1:
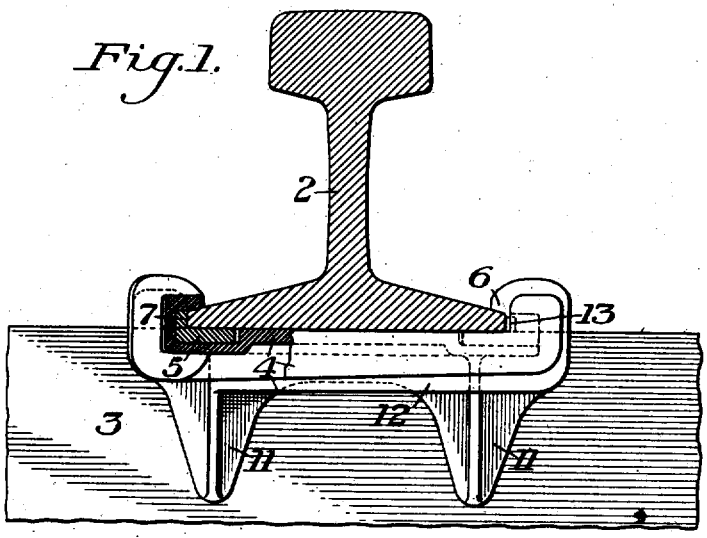
Figure 2:
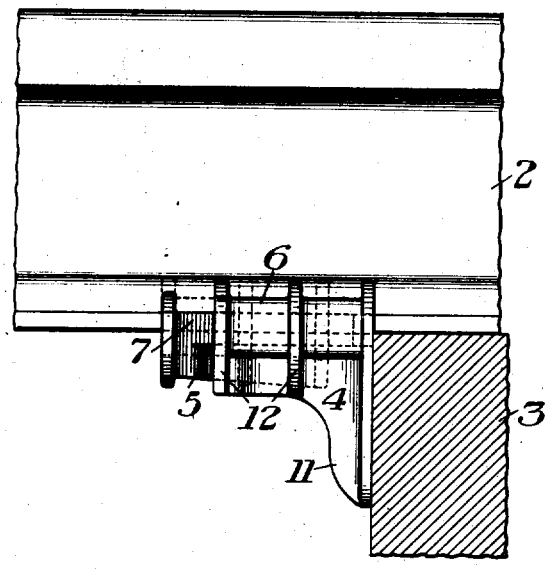
Figure 3:
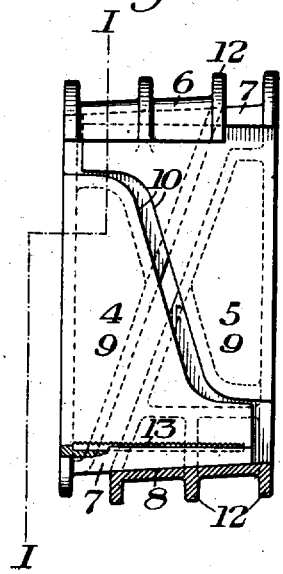

Figure 1 is a sectional end elevation of a rail anchor embodying my invention; the section being taken on the line I—I of Fig. 3; Fig. 2 is a side elevation of the same with the tie in section and the rail broken away; and Fig. 3 is a plan view of the anchor removed.

My invention has relation to rail anchors, and is designed to provide a device of this character which is simple in its construction, which can be manufactured at a comparatively low cost, which can be readily applied to a rail, and which will effectually prevent creeping or endwise movement of the rail.

The nature of my invention will be best understood by reference to the accompanying drawings, in which I have shown the preferred form thereof, and which will now be described, it being premised, however, that various changes can be made in the details of construction and arrangement of the parts without departing from the spirit and scope of my invention.

In the drawings, the numeral 2 designates a rail and 3 a cross-tie.

My improved anchor comprises two pieces or sections 4 and 5 of complementary form. Each section has at one of its longitudinal edges an overhung lip or flange 6, and at its opposite edge a raised rib or lip 7, which is of tapered or wedge form, the outer wall of the overhung flange 6 being also tapered or beveled, as clearly shown at 8 in Fig. 3. The web portion 9 of each section, upon which the rail seats, is obliquely cut away as indicated at 10, so that the two sections may be applied to each other in the manner shown in Fig. 3, the raised rib 7 of one section engaging the overhung flange 6 of the other section. One of the sections, in the present instance the section 4, is provided with the downward projections 11, adapted to abut against the tie 3, as shown in Fig. 2. The sections are provided with the strengthening ribs 12. Preferably the raised rib 7 of one section is roughened or serrated as shown at 13 for more secure engagement with the outer edge of the rail base. Where the anchor is made of relatively soft metal, this roughened face may be provided by a separate insert of harder metal such as steel.

When the sections are applied to a rail in the manner shown, and one section is driven into another, the wedging faces of the ribs 7 and overhung flanges 6 cause the inner faces of said ribs to exert a powerful gripping action against the outer edges of the rail base, and thus prevent any tendency of the rail to move endwise therethrough, the engagement of the downward projections 11 with the tie 3 in the direction in which the rails would otherwise have a tendency to creep preventing any movement of the anchor with the rails.

My improved anchor can be readily manufactured at comparatively low cost, since the sections can be readily cast; it can be quickly applied to a rail, and is highly efficient in practical operation.

It will be obvious that various changes may be made in the form of the anchor sections without departing from the spirit and scope of my invention.

What I claim is:—

1. A rail anchor comprising two parts or sections having a longitudinal wedging engagement with each other at each side of the rail base and at the outer edges thereof and arranged to grip the base of the rail, each section having at one side means for engagement with the base flange of the rail, and at the opposite side a portion which forces the other section into gripping engagement with the rail; substantially as described.

2. A rail anchor, comprising two parts or sections, each extending transversely underneath the rail base, each of said parts or sections having means for engaging one edge of a rail base, and the sections having a longitudinal wedging engagement with each other at the outer edges of the rail base; substantially as described.

3. A rail anchor comprising two parts or sections, each extending transversely underneath the rail base, one of which is arranged to slide longitudinally upon the other, and having coacting wedging surfaces in the horizontal plane of the rail base, each of said sections having a rail base gripping portion, and one of said sections having a tie-engaging portion; substantially as described.

4. A rail anchor comprising two parts or members, each of said members having at one edge a wedge-shaped lip or flange, and at the other edge an overhung flange formed with a wedging or tapered outer wall, the overhung flange of one section being arranged to engage the raised lip or flange of the other section; substantially as described.

5. A rail anchor comprising two parts or members, each of said members having at one edge a wedge-shaped lip or flange, and at the other edge an overhung flange formed with a wedging or tapered outer wall, the overhung flange of one section being arranged to engage the raised lip or flange of the other section, and one of said raised ribs or flanges having a serrated inner rail-gripping surface; substantially as described.

6. A rail anchor comprising two parts or members having a sliding and wedging engagement with each other at each side of the rail base and at the outer edges thereof, and provided each with a rail base gripping portion, and one of said members having a depending tie-engaging portion; substantially as described.

7. A rail anchor, comprising a plurality of cast parts having sliding horizontal wedging engagement with each other, said parts being arranged to grip the ordinary bottom flanges of a rail, and one of said parts having bearing upon the tie near its opposite side edges to hold said part against endwise movement when the other part slides relatively to it; substantially as described.

8. A rail anchor, composed of a plurality of castings having a sliding horizontal wedging engagement with each other at the sides of the rail base, one of said casings having depending separated projections with reinforcing webs and arranged to engage different portions of the tie; substantially as described.

In testimony whereof, I have hereunto set my hand this 16th day of December 1911.

JACOB J. BYERS.

Witnesses:
H. M. CORWIN,
C. P. BYRNES.

Copies of this patent may be obtained for five cents each, by addressing the "Commissioner of Patents, Washington, D. C."